(12) United States Patent
Ketrenos

(10) Patent No.: US 7,280,153 B2
(45) Date of Patent: Oct. 9, 2007

(54) DISPLAYING DATA ON LOWER RESOLUTION DISPLAYS

(75) Inventor: James P. Ketrenos, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/900,885

(22) Filed: Jul. 28, 2004

(65) Prior Publication Data

US 2005/0018075 A1    Jan. 27, 2005

Related U.S. Application Data

(62) Division of application No. 09/301,238, filed on Apr. 28, 1999, now Pat. No. 6,788,311.

(51) Int. Cl.
    *H04N 7/01* (2006.01)
(52) U.S. Cl. ...................................................... 348/446
(58) Field of Classification Search ............... 348/441, 348/445, 446, 455, 458, 459; 345/660, 698
    See application file for complete search history.

(56) References Cited

U.S. PATENT DOCUMENTS

| | | | |
|---|---|---|---|
| 4,866,520 A * | 9/1989 | Nomura et al. ............. 348/441 |
| 5,838,296 A * | 11/1998 | Butler et al. ................ 345/669 |
| 5,861,864 A * | 1/1999 | Jensen ...................... 715/500.1 |
| 5,912,711 A * | 6/1999 | Lin et al. ..................... 348/446 |
| 6,064,437 A * | 5/2000 | Phan et al. .................. 348/446 |
| 6,097,437 A * | 8/2000 | Hwang ........................ 348/441 |
| 6,281,933 B1 * | 8/2001 | Ritter ......................... 348/447 |
| 6,288,702 B1 * | 9/2001 | Tachibana et al. .......... 345/671 |
| 6,788,311 B1 * | 9/2004 | Ketrenos .................... 345/660 |
| 6,842,195 B2 * | 1/2005 | Huang et al. ............... 348/446 |
| 7,061,537 B2 * | 6/2006 | Lee et al. .................... 348/447 |
| 7,084,925 B2 * | 8/2006 | Lee et al. .................... 348/446 |

* cited by examiner

*Primary Examiner*—Paulos Natnael
(74) *Attorney, Agent, or Firm*—Trop, Pruner & Hu, P.C.

(57) ABSTRACT

Data intended to be displayed on a higher resolution display such as a non-interlaced display used as a computer monitor may be converted for display on a lower resolution display such as an interlaced display. The conversion may be done in a way that preserves the intended frame format while enhancing readability. For example, in one embodiment, the frames intended for non-interlaced display may be preserved in size for display in the same frame format on a lower resolution interlaced display. Local magnification may be selectively implemented for particular regions to enhance the readability of those regions. Upon selection, such local magnification may provide pixel loss and color corrections in addition to local magnification. In this way the frame format may be preserved while enhancing readability.

2 Claims, 5 Drawing Sheets

DISPLAYING DATA ON LOWER RESOLUTION DISPLAYS

This is a division of prior Application No. 09/301,238, filed Apr. 28, 1999 now U.S. Pat No 6,788,311.

BACKGROUND

This invention relates generally to the display of information intended for higher resolution display on a lower resolution format receiver.

There is increasing interest in displaying information normally displayed on a computer monitor on a television receiver. For example, set-top computers display computer information on an associated television receiver. In this way, conventional computer functions can be achieved without the cost of a monitor and in addition, computer functions can be applied to television reception. For example, set-top computers may implement electronic programming guides which allow access to programming information on the Internet or other sources. These guides also allow the user to select programs for viewing on his or her television receiver through interactions with graphical user interfaces.

Conventionally, computer systems display information on computer monitors in a non-interlaced or progressively scanned format making use of individual pixels which are displayed essentially simultaneously. Television receivers have conventionally utilized an interlaced display. An interlaced display may be divided into two interleaved segments. The odd numbered segments are scanned first and then the even numbered segments are interleaved in between to create a complete picture. Each of the segments, which are formed by a scanning electron gun, may be described as a "field." A conventional television picture or frame may be made up of two fields. Recent digital television standards may also use progressive or non-interlaced scanning approaches.

Information, which was intended to be displayed on a computer monitor, may be degraded when displayed on a television screen. Among other things, the resolution on most television receivers is substantially less than that of computer monitors. The interlacing of the picture on the television receiver may also cause information to be lost. In addition, the color resolution of monitors may be better so that adverse hue and color saturation may occur when displaying computer information on television receivers.

In view of the lower resolution of most television receivers, a decimator may be used to intelligently remove horizontal rows of data from a frame meant for computer display. However, while this approach preserves the layout of the frame, it results in loss of resolution.

In some cases, content developed for display on a higher resolution display may actually be displayed on a lower resolution display than was intended. For example, content developed in a 1024×764 format may be displayed on a 640×480 display (such as a high definition TV display). Because the display resolution is lower, some of the data may be difficult to read.

Thus there is a continuing need for better ways to display information designed for a higher resolution format on a lower resolution display.

SUMMARY

In accordance with one embodiment, a method of displaying information on a lower resolution display includes receiving data formatted for display on a higher resolution display. A portion of the lower resolution display is selectively enlarged.

DETAILED DESCRIPTION

An interlaced display system 10 may include a remote control unit (RCU) 12, a processor based system 16, and a television receiver 18, in one embodiment of the present invention. The RCU 12 may communicate with either or both the system 16 and the receiver 18 using for example, infrared signals. The television receiver 18 is electrically coupled to the system 16, which in turn, may be coupled to receive a source of video such as a television antenna, a satellite antenna, a cable system, or another form of network connection.

As processor based systems, such as the system 16, are generally designed for operation with progressively scanned or non-interlaced displays, problems may arise in using the processor based system 16 with the television receiver 18 or other interlaced displays. The problems that arise may be generally categorized into three types. One type may be described as pixel loss, which is essentially the loss of one or more pixels of the non-interlaced display when displayed on an interlaced system such as the system 18. The second kind of problem that arises is a result of the higher resolution of the non-interlaced display when displaying colors and the effect of color juxtaposition in certain displays. The final set of problems relate to the formatting of interlaced and non-interlaced systems. Ideally, one would like to use the original format of each frame so that the viewer may get the visual effect which was originally intended. However because of the lower resolution of the television receiver 18 as opposed to the intended computer monitor display, less than the entire non-interlaced frame may be displayed on the interlaced display.

Figure 3A:
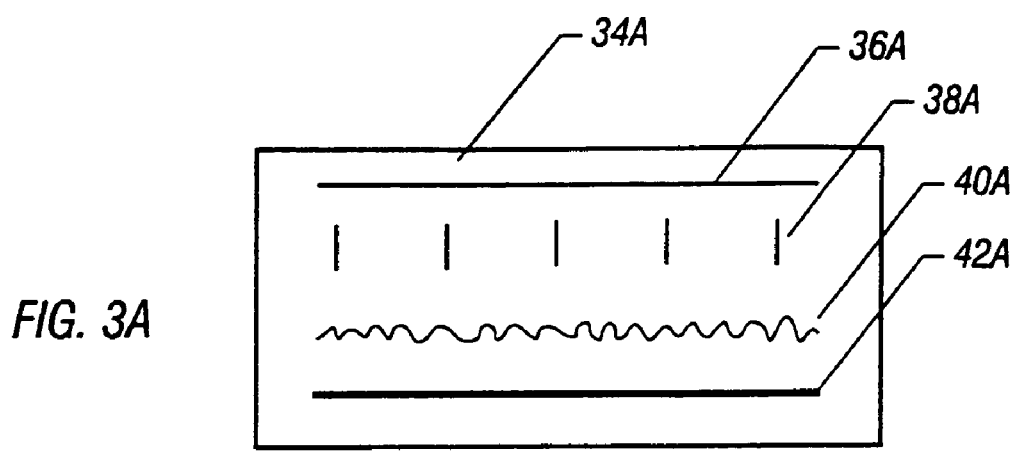
FIG. 3a shows a hypothetical frame displayed on a computer monitor.
Figure 3B:
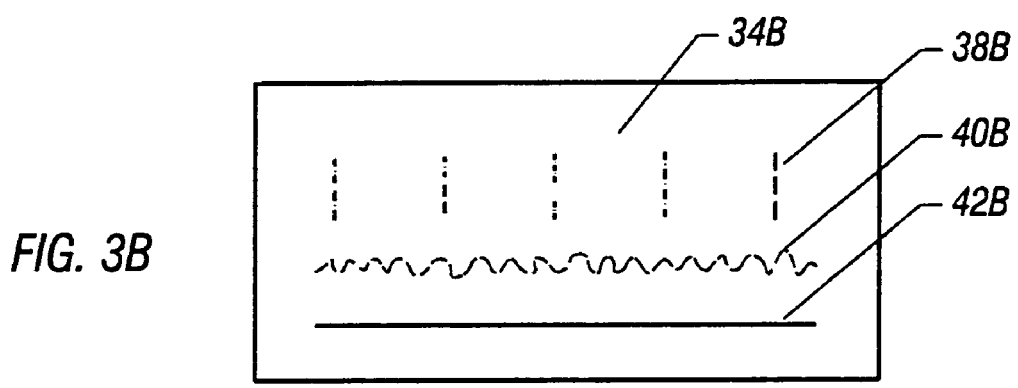
FIG. 3b shows the same information shown in FIG. 3a when displayed on an interlaced display.

For example, referring to FIGS. 3a and 3b, the phenomenon of pixel loss is illustrated. In FIG. 3a, showing a hypothetical display on a non-interlaced system, a horizontal line 36a, a series of short vertical lines 38a, a wavy line 40a and a relatively thick horizontal line 42a are displayed on a display 34a. The same information, displayed on an interlaced display, as shown in FIG. 3b, results in pixel loss. The horizontal line 36a may be completely lost at least for an instance of refresh time. This may arise because of the interlacing effect wherein first one field is displayed and then subsequently the next adjacent field is displayed and each of these fields are alternately refreshed.

If the horizontal line 36a is of a thickness corresponding to one interlaced line, it may only be displayed every other refresh recycle, resulting in at least its temporary loss. Similarly detail may be lost in the vertical lines 38a for the same reasons. The same intermittent effect may be seen in the wavy line 40A. Similarly, with the line 42a which may be two lines thick, intermittently, one line may be lost resulting in loss of detail, jitter, and other annoying optical effects.

Figure 4A:
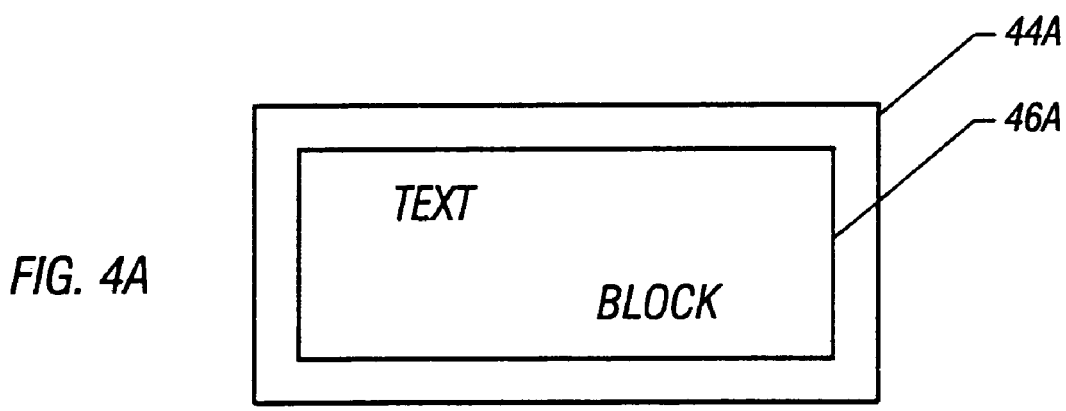
FIG. 4a shows a text block displayed on a high resolution, non-interlaced display.
Figure 4B:
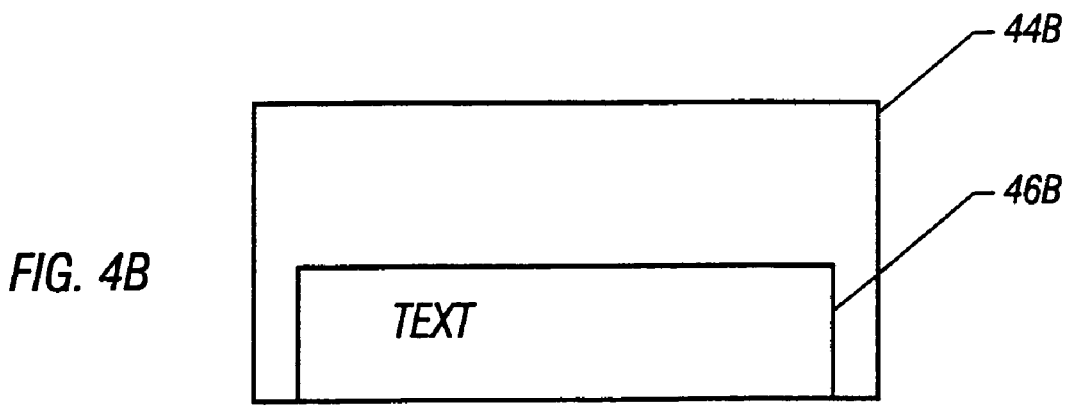
FIG. 4b shows the same text block shown in FIG. 4a when displayed without modification on an interlaced lower resolution display.

Referring next to FIGS. 4a and 4b, the effect of lower resolution on interlaced displays is illustrated. FIG. 4a shows a text block 46a intended to be displayed on a non-interlaced display 44a of higher resolution. One way to display the text block 46a on a lower resolution interlaced display is to display only part of the text block on the lower resolution display at any given time. Thus, part of the text block 46b would be cut off in the interlaced display 44b. The problem here is that often a given visual effect was intended in the design of the frame for non-interlaced display and this effect may be lost when converting to interlaced display.

Figure 1:
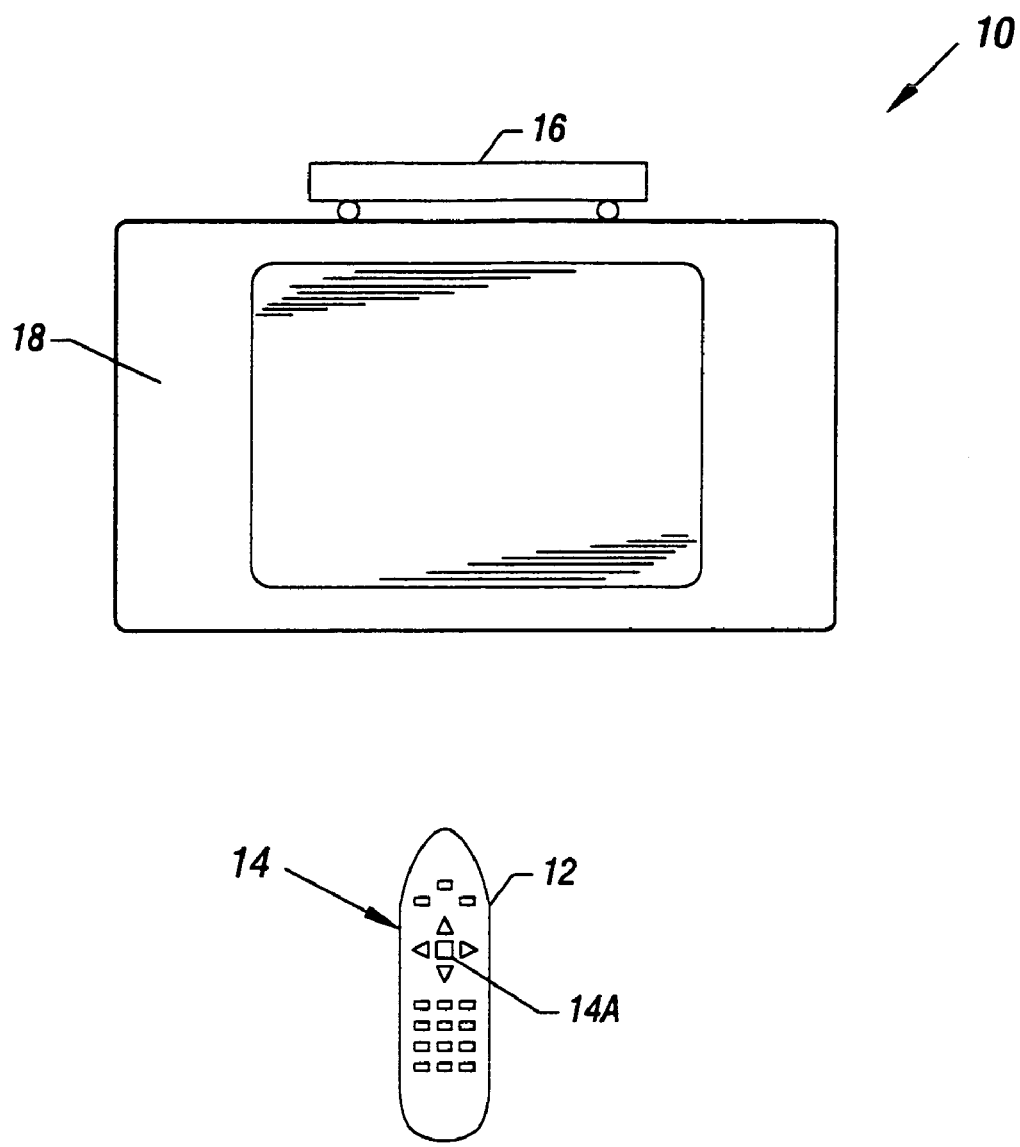
FIG. 1 is a front elevational view of one embodiment of the present invention.
Figure 2:
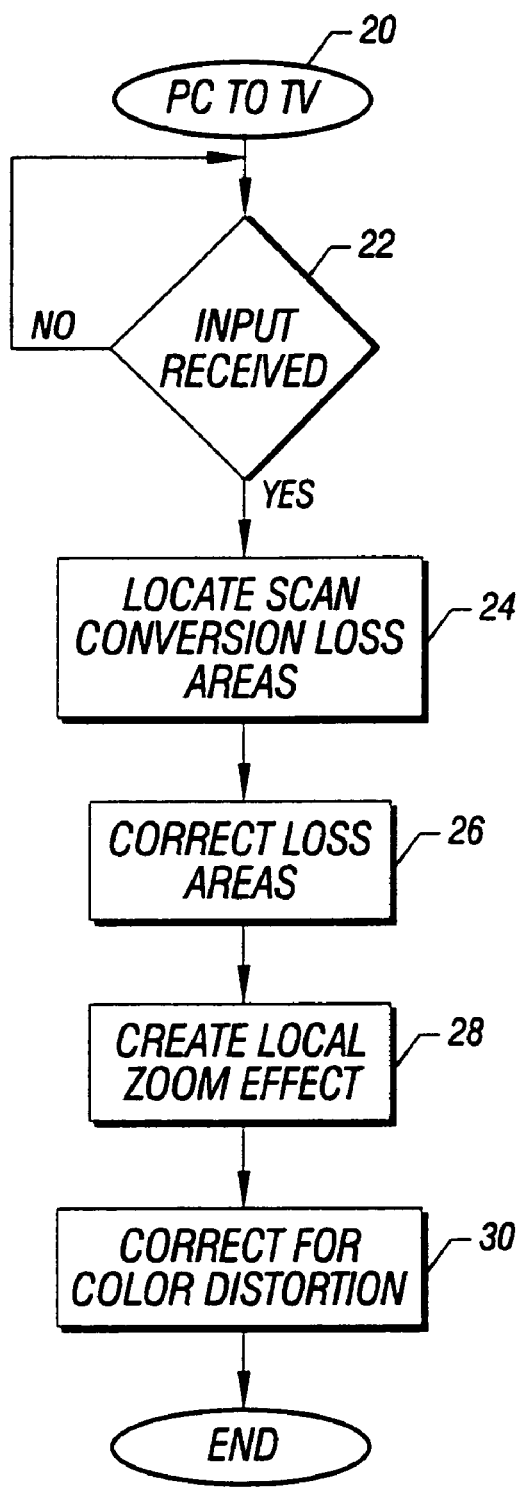
FIG. 2 is a flow chart for software for implementing one embodiment of the system shown in FIG. 1.

Referring to FIG. 2, software may be utilized to convert formats intended for display on a non-interlaced system into formats more desirable for display on an interlaced system. Initially, a check at diamond 22 determines whether the user has identified a specific region for conversion. This may be done by placing a mouse cursor on a given region of an interlaced display 18. Alternatively, a region for conversion may be automatically implemented adjacent the text entry caret. For example, referring to FIGS. 5a and 5b, a line of text 50a on a display 48a may be clicked on by a mouse cursor 54 to create a region 52 of local magnification in the line 50b in a frame 48b.

Thus correction may be initiated by the viewer as desired with respect to local regions. In one embodiment of the present invention, the entire display frame may, if necessary, be reduced in size to fit in the same format as was originally intended for a computer display. This may increase the loss of resolution, but allows the viewer to see the display as originally intended. In many cases, the flow of the information is somewhat tied to the formatting by page or frame of that information, and causing it to spread from frame to frame may disrupt the flow of information. Thus in some embodiments, the information may actually be formatted exactly the same as was intended for higher resolution displays.

Figure 5A:
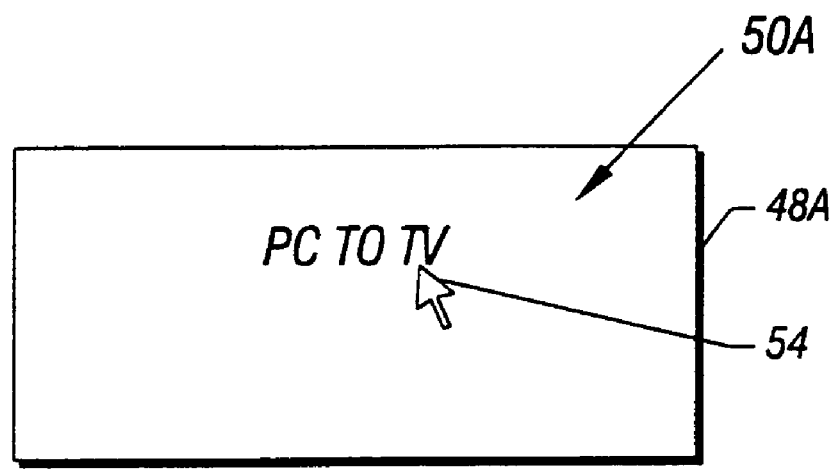
FIG. 5a shows a conventional frame displayed on a non-interlaced display.
Figure 5B:
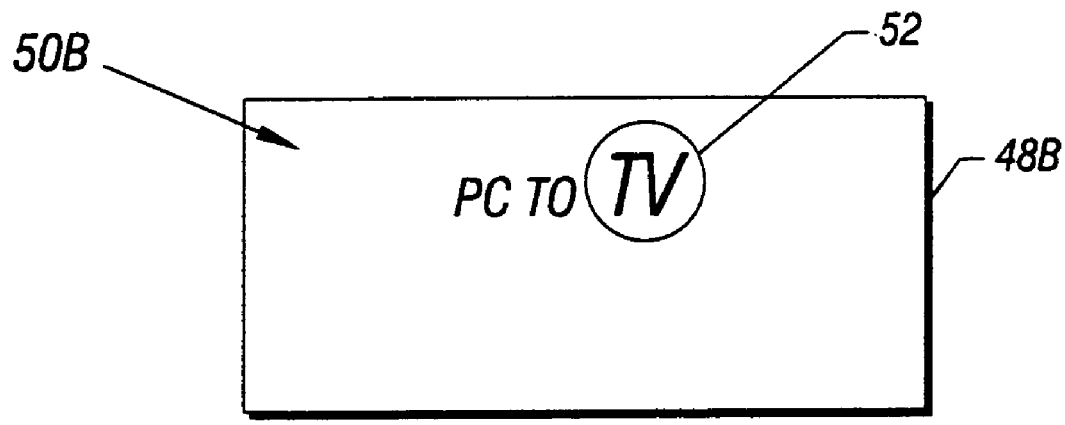
FIG. 5b shows the same frame, displayed with magnification, on an interlaced display.

Next, the software 20 may locate potential conversion loss areas (block 24, FIG. 2). Once a region for correction is identified using either a mouse cursor as illustrated in FIGS. 5a and 5b or the text caret for text entry, the software may identify suspicious areas where it would be likely that pixel loss would occur. For example referring to the line 36a in FIG. 3a, it is known that a thin horizontal lines may be intermittently lost. If the thin line appears for a relatively short time, it may never even be displayed, as illustrated in FIG. 3b.

Thus the system may look for thin segments that may be lost in subsequent display. It may do this in two ways. It may look for horizontal lines that are less than the height of one interlaced scan. It may also look for lines which are relatively solid but have intermittent breaks in them and may assume that a conversion loss has occurred. Upon selection of that region for magnification, the suspected missing material may be provided as indicated in block 26.

Next a local zoom effect is created in a given region proximate to the cursor or caret (block 28, FIG. 2). Namely, a circular magnification region 52 (FIG. 5b) may be utilized wherein anything within that region is automatically magnified. Other formats may include rectangular magnification regions. For Arabic text, which is read from left to right, the magnification region may, in one embodiment, be a horizontal rectangular box. For Chinese and other vertical reading systems, the magnification region may be a vertically oriented rectangle.

In any case, everything within the magnification region is automatically magnified using known software techniques used for text readers. This magnification may restore sufficient definition, using the pixel loss corrections described above, to make the material readable. Thus the viewer may select for magnification a region where the viewer believes pixel loss has occurred. Correction may then be immediately implemented. This enables readability to be obtained without reformatting the entire frame, which could result in loss of flow of information.

Next, as indicated in block 30 in FIG. 2, within the selected region for magnification, color corrections may also occur. For example, color saturation levels may be automatically adjusted based on known distortion from converting to interlaced display. While high resolution computer displays can display bright red pixels next to bright white pixels, these juxtapositions may result in jitter and bleeding in interlaced displays. Color saturation levels may be automatically adjusted to avoid this effect in the local region identified by the viewer. In addition, colors which are known not to convert correctly from high resolution displays to interlaced displays may be adjusted within the local region.

The amount of time that the magnification stays resident is determined by how long the user selects the appropriate mouse button in one example. In addition, the system may be such that the user can also input desired magnification levels. That is, by selecting a different mouse button, in one embodiment, the user can select a variety of magnification levels each of increasing magnification. Thus, if a given level of magnification does not resolve the problem, still additional magnification may be selected.

In systems using an RCU 12, these magnification levels may be selected using the RCU in one embodiment. The RCU 12 may have navigation buttons 14 used to navigate a cursor to a desired location. The desired level of magnification may be selected by repeatedly clicking on the selection button 14a until the desired level is achieved.

Figure 6:
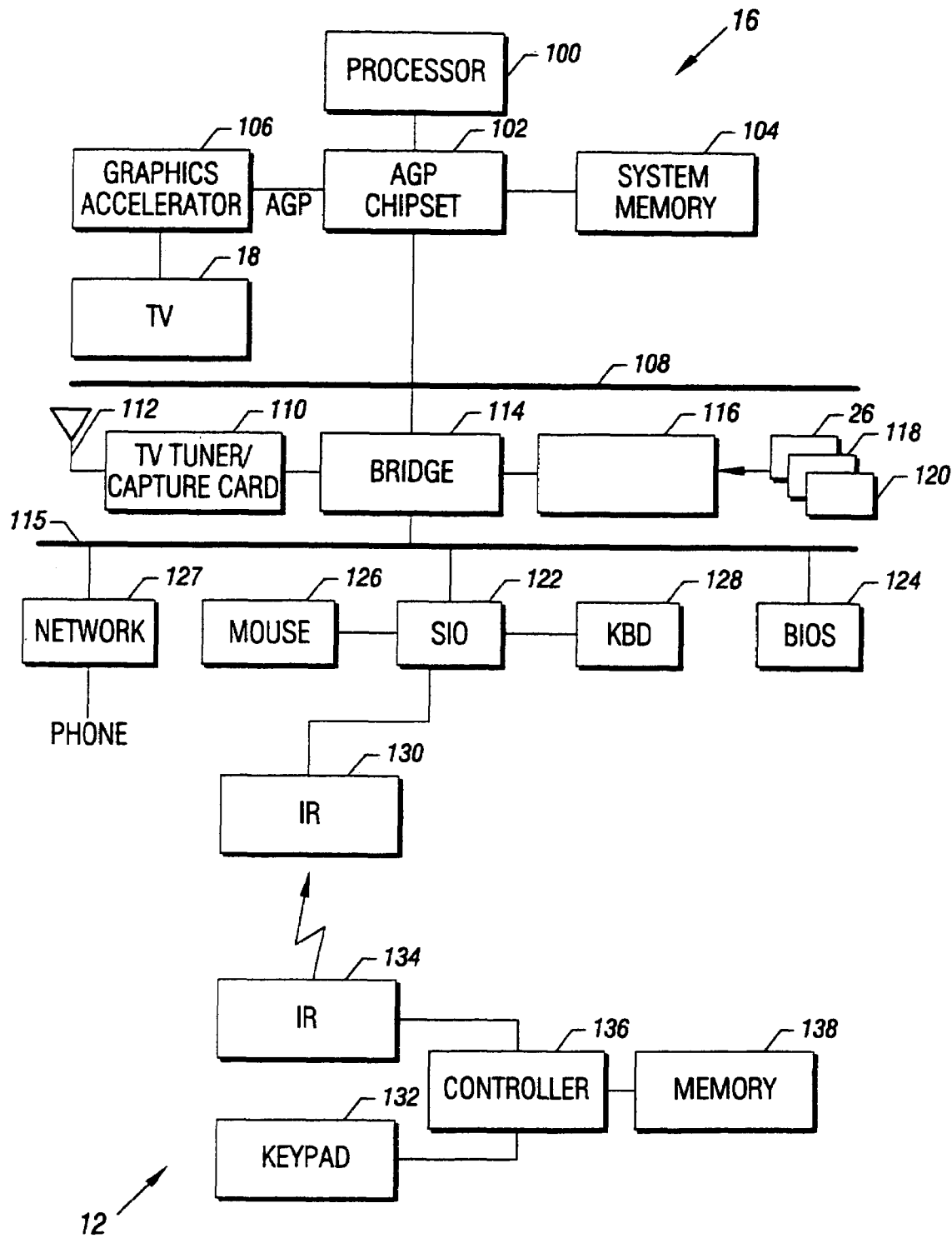
FIG. 6 is a block diagram showing one embodiment for implementing the system shown in FIG. 1.

Referring now to FIG. 6, an example of a system for providing the capabilities described previously may involve either a computer, a television receiver, a set-top computer system or another appliance. The illustrated system 16 includes a processor 100 coupled to an accelerated graphics port (AGP) chipset 102. AGP is described in detail in the Accelerated Graphics Port Interface Specification, Revision 2.0, published in May 1998 by Intel Corporation of Santa Clara, Calif.

The AGP chipset 102 may in turn be coupled to system memory 104 and a graphics accelerator 106. The graphics accelerator 106 may be coupled to a TV receiver 18.

The chipset 102 may also be coupled to a bus 108 which in turn may be coupled to a TV tuner/capture card 110. The tuner/capture card 110 may be coupled to a television input signal 112. The input signal 112 may, for example, be a conventional TV antenna, a satellite antenna, a cable connection, or other video source. The card 110 may receive television signals in one video format and may convert them into a format used by the system 16.

The bus 108 may also be coupled to another bridge 114 which in turn couples a memory 116. The memory 116 may store the software 20. The memory may be a hard disk drive or a FLASH memory, as examples.

The bridge 114 may be coupled to a bus 115 coupled to a serial input/output (SIO) device 122, a network 127 and a basic input/output system (BIOS) 124. The SIO device 122 may interface to a mouse 126 and a keyboard 128. The SIO device may also be coupled to the RCU 12 through an interface 130 to enable the system to receive inputs from a wireless remote control. The network 127 may be, for example, a connection to a telephone network or a local area network. As mentioned previously, the RCU 12 may provide either infrared or radio-frequency signals which may be received by the interface 130.

An infrared interface 130 may, for example, be in accordance with the Infrared Data Association protocols such as, for example, the Serial Infrared Physical Layer Link Specification, version 1.2, dated Nov. 30, 1997. The remote control unit 12 may include a keypad 132 coupled to an infrared transmitter 134 that transmits the infrared signals received by the interface 130. A controller 136 may be provided to control both the transmitter 134 and to receive information from the keypad 132. The controller 136 may have associated with it memory 138, which in one illustrated embodiment may be nonvolatile random access memory (NVRAM). The memory 138 may store the information provided by the system 16 to enable the RCU 12 to provide the appropriate signals to particular electronic devices to be controlled.

The graphical user interfaces described herein are visual representations of memory states. The graphical user interfaces displayed on the display 18 may be stored in a memory such as one or more of the memories 104 or 116.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of displaying information on a television display comprising:
   receiving data formatted for display on a computer monitor;
   selectively replacing a portion of the data displayed with a larger image thereof on the television display; and
   correcting said larger image for a loss of image information into an automatically magnified region with at least one correction for an optical distortion that occurred in the portion of said data based on a scan disparity between the computer monitor and television display.

2. The method of claim 1, including magnifying the portion of the data displayed itself to provide the larger image and a higher resolution with respect to the data displayed on the television display.

* * * * *